United States Patent [19]

Hanyu et al.

[11] 4,448,575
[45] May 15, 1984

[54] TIRE VULCANIZING PRESS

[75] Inventors: Takaomi Hanyu; Nobuhiko Irie; Akira Hasegawa; Teruaki Muta; Katsuyoshi Sakaguchi; Toshihisa Ikeda; Yoshiharu Itayama; Akira Nakahara, all of Nagasaki, Japan

[73] Assignee: Mitsubishi Jukogyo Kabushiki Kaisha, Japan

[21] Appl. No.: 513,065

[22] Filed: Jul. 12, 1983

[30] Foreign Application Priority Data

Jul. 13, 1983 [JP] Japan .................. 58-121572

[51] Int. Cl.³ .......................... B29H 5/02; B29H 5/08
[52] U.S. Cl. .................... 425/47; 425/451.2
[58] Field of Search ........... 425/23, 28 R, 47, 451.2, 425/595, DIG. 223, 590

[56] References Cited

U.S. PATENT DOCUMENTS

| | | | |
|---|---|---|---|
| 2,689,978 | 9/1954 | Roger | 425/451.2 |
| 2,718,663 | 9/1955 | Roger | 425/451.2 |
| 3,156,014 | 11/1964 | Wenger | 425/595 X |
| 3,263,277 | 8/1966 | Ohlendorf et al. | 425/451.2 |
| 3,270,372 | 9/1966 | Hesse | 425/451.2 |
| 3,666,387 | 5/1972 | Cyriax | 425/590 X |
| 3,669,593 | 6/1972 | Cyriax | 425/451.2 X |
| 3,716,323 | 2/1973 | Classen | 425/451.2 |
| 3,737,278 | 6/1973 | Putzler | 425/451.2 |
| 3,768,953 | 10/1973 | Dangremond et al. | 425/451.2 |
| 3,829,266 | 8/1974 | Melcher | 425/451.2 X |
| 3,918,861 | 11/1975 | Klose | 425/47 |
| 4,032,277 | 6/1977 | Linde et al. | 425/451.2 X |
| 4,130,384 | 12/1978 | MacMillan | 425/451.2 X |
| 4,245,971 | 1/1981 | MacMillan | 425/47 |
| 4,318,682 | 3/1982 | Larson et al. | 425/47 X |
| 4,383,808 | 5/1983 | Kubo et al. | 425/47 |
| 4,383,816 | 5/1983 | Kumazaki | 425/47 X |

FOREIGN PATENT DOCUMENTS 1127067  4/1962  Fed. Rep. of Germany ... 425/451.2

*Primary Examiner*—J. Howard Flint, Jr.
*Attorney, Agent, or Firm*—McGlew and Tuttle

[57] ABSTRACT

An improved tire vulcanizing press of the type including an upper frame, a lower frame and side frames by way of which said upper frame and said lower frame are integrally connected to one another, wherein a lower die half is fixedly mounted on the lower frame and an upper die half is fixedly secured to a raising and lowering table adapted to be raised up or lowered by means of a raising and lowering means fixedly attached to the upper frame in such a manner that the upper die half is displaced away from or toward the lower die half is disclosed, wherein the improvement consists in that a working cylinder, a spacer and a distance plate are arranged between the upper frame and the upper die half, said distance plate being adapted to move from the operative position in the vulcanizing press to the inoperative one located outward of the latter and vice versa, whereby valcanizing operation is safely carried out with the minimized die opening in the event of malfunction caused with respect to the working cylinder.

5 Claims, 7 Drawing Figures

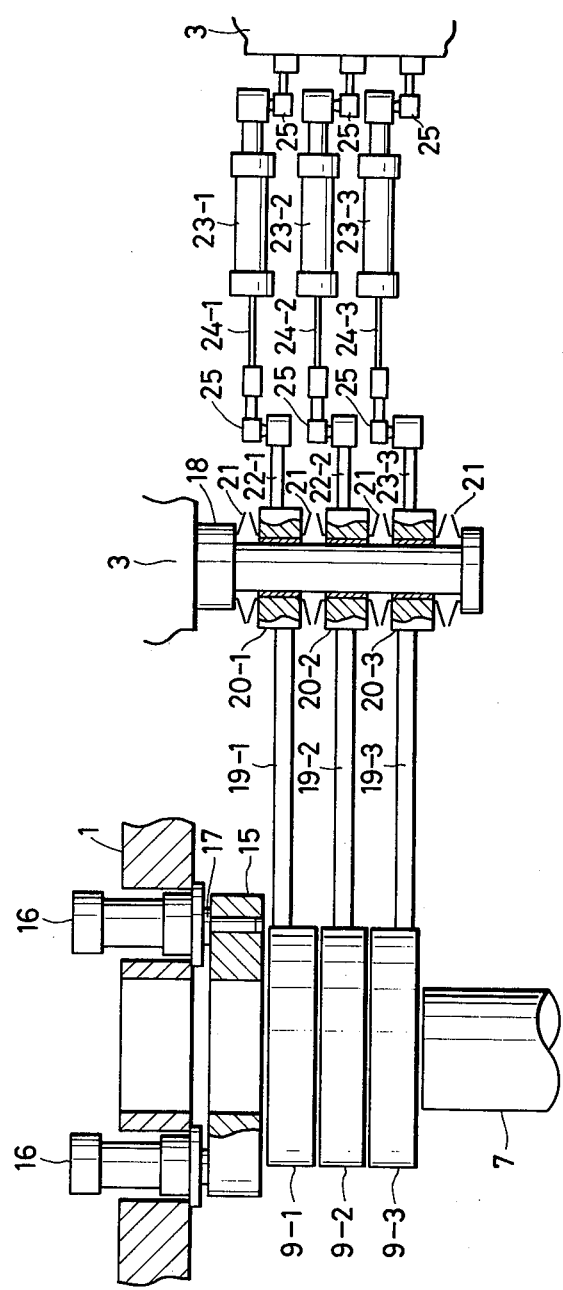

TIRE VULCANIZING PRESS

The present invention relates to a tire vulcanizing press and more particularly to an improved hydraulic tire vulcanizing press of the type including an upper frame, a lower frame and both side frames, wherein a die comprising an upper die half and a lower die half is tightly closed by means of a raising and lowering table fixedly secured onto the upper die half, said raising and lowering table being adapted to be raised up or lowered with the aid of a hydraulic press.

A hitherto known hydraulic tire vulcanizing press is generally constructed so that a raising and lowering table has a working stroke of about 1,000 mm in case of tires for passenger car or about 2,000 mm in case of tires for truck, bus or the like vehicle so as to allow a green tire to be vulcanized to be loaded on the lower die half and therefore a hydraulic cylinder for tightly closing both the die halves is designed to have a correspondingly long working stroke. Accordingly, when there occurs pressure reduction due to leakage of hydraulic oil from packings on hydraulic line in the vulcanizing press during tire vulcanizing, there is fear of causing an amount of die opening between both the die halves to exceed the specified limitative value, resulting in an occurance of leakage of vulcanizing medium (steam, high pressure and temperature water, high pressure and temperature gas or the like) from the interior of the die. To take remedial activity against malfunctions as described above there have been already made various proposals. One of them is to employ expensive components such as breach lock ring or the like means and another one is to mount a hydraulic control device or the like adapted to be actuated by means of a pressure switch. However, it has been found that any one of these proposals fails to function properly as means for minimizing an amount of die opening between both the die halves.

Thus, the present invention has been made with the foregoing problems in mind and its object resides in providing an improved tire vulcanizing press which assures the minimized die opening by means of mechanical arrangement.

Other object of the present invention is to provide an improved vulcanizing press in which vulcanizing operation is carried out safely.

Another object of the present invention is to provide an improved vulcanizing press which can be manufactured at an inexpensive manufacturing cost.

To accomplish the above objects there is proposed in accordance with the invention a tire vulcanizing press of the early mentioned type which is characterized in that the raising and lowering table has a vertically extending member fixedly mounted thereon, a working cylinder is secured to the bottom of the upper frame and a distance plate is disposed between the working cylinder and the vertically extending member in such a manner as to move away from the operative position in the vulcanizing press to the inoperative position located outward of the latter and vice versa. This characterizing features of the invention assures that vulcanizing operation is carried out with a tightly closed die onto which depressing force is transmitted from the working cylinder via the distance plate, the vertically extending member and the raising and lowering table. Since the vertically extending member and the distance plate are arranged between the upper frame and the raising and lowering table, the working cylinder can be designed to have a very short working stroke by which required depressing force can be reliably transmitted to the die without any fear of exceeding a certain die opening specified for assuring safe vulcanizing operation. Thus, any excessively wide die opening can be reliably prevented by means of a combination of the distance plate and the vertically extending member, when there occurs pressure reduction in the working cylinder due to failure, injury or the like. As a result vulcanizing medium does not leak from the interior of the die. Further, since the working cylinder is designed to have a very short working stroke owing to the arrangement of the vertically extending member and the distance plate as described above, tight closing can be precisely achieved for the die within a very short period of time.

Other objects, features and advantages of the present invention will be more clearly apparent from reading of the following description prepared in conjunction with the accompanying drawings.

The accompanying drawings will be briefly described below.

FIG. 4 is a partial sectional view of the section IV in FIG. 3, shown in the expanded state and in an enlarged scale.

Now, the present invention will be described in a greater detail hereunder with reference to the accompanying drawings which illustrate preferred embodiments of the invention.

Figure 1:
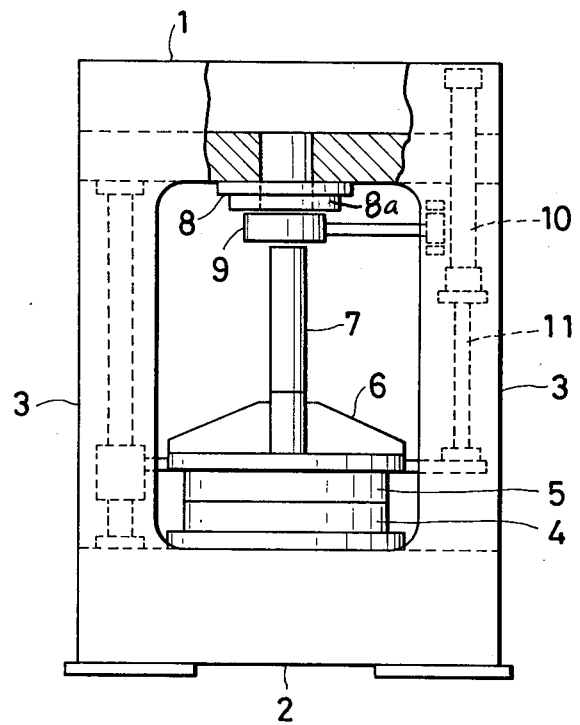
FIG. 1 is a partially sectioned front view of a tire vulcanizing press in accordance with the first embodiment of the invention.
Figure 2:
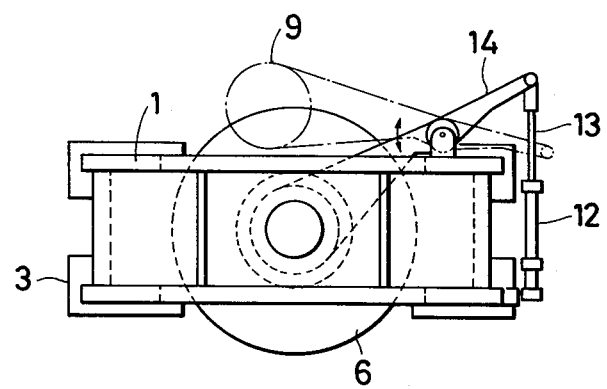
FIG. 2 is a plan view of the tire vulcanizing press in FIG. 1.

Description will be first made as to the first embodiment as illustrated in FIGS. 1 and 2.

A vulcanizing press includes an upper frame 1 and a lower frame 2 both of which are integrally connected to one another by way of side frames 3 so that a lower die half 4 constituting a part of a die is firmly mounted on said lower frame 2 and an upper die half 5 constituting another part of the same is fixedly secured to a raising and lowering table 6. The latter has a vertically extending member 7 fixedly connected thereto and the upper die half 5 is adapted to move up away from the lower die half 4.

A working cylinder 8 with piston 8a and a distance plate 9 are arranged between the upper frame 1 and the vertically extending member 7 of the raising and lowering table 6 so that depressing force given by the piston 8a of the working cylinder 8 is transmitted to the die by way of the distance plate 9, the vertically extending member 7 and the raising and lowering table 6. The working cylinder 8 is fixedly secured to the upper frame 1 at the predetermined position, for instance, at the lower side thereof. The central part of the working cylinder 8 and its piston 8a have the configuration of a doughnut with a through hole formed therein. The through hole at the central part of the working cylinder and piston 8,8a has an inner diameter which is dimensioned larger than the outer diameter of the vertically extending member 7 on the raising and lowering table 6 and moreover the fitting portion of the working cylinder 8 located at the upper frame side is also formed with a through hole. The distance plate 9 has an outer diameter which is dimensioned larger than the inner diameter of the through hole of the working cylinder and piston and it is turnably supported from the upper frame 1 or the side frame 3 as illustrated in FIG. 2 so that it moves reciprocably between the first position located outward of the vulcanizing press and the second position located inward of the same.

The vulcanizing press in accordance with the first embodiment is constructed in the above-described manner so that a green tire to be vulcanized is loaded on the lower die half 4 by means of a green tire loading device (not shown) and an assembly of the raising and lowering table 6, the thermal insulating plate, the upper hot plate and the upper die half 5 is then caused to move down by allowing a rod 11 of the auxiliary hydraulic cylinder 10 to expand downward until said assembly is placed on the lower die half 4. Next, as a hydraulic or pneumatic cylinder 12 is actuated so as to allow its rod 13 to expand outward as illustrated in FIG. 2, the distance plate 9 is displaced from the first position located outward of the vulcanizing press to the second position located inward of the same and thereby it is disposed between the vertically extending member 7 on the lowered table 6 and the working cylinder 8. As the working cylinder 8 is then actuated by hydraulic pressure so as to allow the piston 8a to expand downward, the upper die half 5 is tightly depressed on the lower die half 4 by way of the distance plate 9, the vertically extending member 7 and the raising and lowering table 6.

Next, removal of a vulcanized tire from the vulcanizing press is carried out in such a manner as described below. The piston 8a of the working cylinder 8 is first raised up and the rod 13 of the cylinder 12 is then caused to contract. The distance plate 9 is horizontally displaced by means of a link 14 operatively connected to the rod 13 from the second position where it is located below the working cylinder 8 as illustrated in FIG. 2 to the first position located outward of the vulcanizing press and thereafter the rod 11 of the auxiliary cylinder 10 is retracted so that the upper die half 5 is displaced upward together with the raising and lowering table 6. Now, a vulcanized tire is ready to be removed from the lower die half 4.

Since the vulcanizing press of the invention is constructed in the above-described manner, it is assured that the distance plate 9 is correctly located between the uppermost end of the vertically extending member 7 on the raising and lowering table 6 and the lowermost end of the piston 8a of the working cylinder 8 before a green tire is vulcanized while the raising and lowering table 6 is kept lowered. Further, a stroke of the working cylinder 8 can be determined to such a very short working stroke that required depressing force is transmitted to the die. Thus, both the upper and lower die halves 4 and 5 can be tightly closed within a very short period of time by means of the distance plate 9, the vertically extending member 7 and the raising and lowering table 6 by operating the working cylinder 8. Moreover, since the working cylinder 8 is designed to have a very short working stroke, it is possible to confine die opening between both the upper and lower die halves 4 and 5 within an allowable extent when there occurs decrease in hydraulic pressure due to malfunction, failure or the like.

Figure 3:
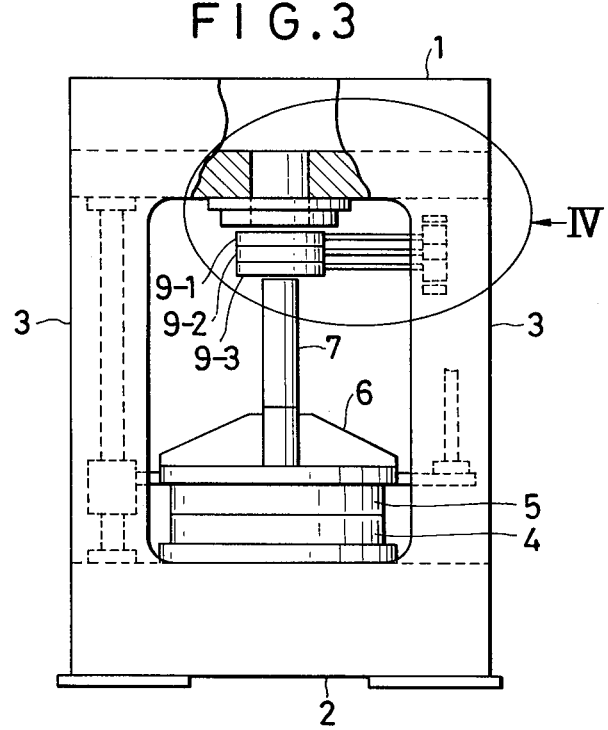
FIG. 3 is a partially sectioned front view of a tire vulcanizing press in accordance with the second embodiment of the invention.

Next, description will be made as to the second embodiment as illustrated in FIGS. 3 and 4.

In this embodiment the doughnut type working cylinder 8 in the foregoing embodiment is replaced with a plurality of working cylinders 16 fixedly mounted on the upper frame 1, said working cylinders 16 including a piston or rod 17 respectively of which lower end part is secured to a doughnut-shaped plate 15 with a through hole formed thereon of which inner diameter is dimensioned larger than the outer diameter of the vertically extending member 7. Further, the distance plate 9 in the foregoing embodiment is replaced with three distance plates 9-1, 9-2 and 9-3 each of which is operatively connected to a shaft 18 stationarily disposed at the predetermined position on the upper frame 1 or the side frame 3. To assure that the distance plates 9-1, 9-2 and 9-3 are turnable about the shaft 18 and moreover they are displaceable in the axial direction, a coned disc spring 21 is disposed between the flange portion of the shaft 18 and the boss 20-1 of the arm 19-1 extending from the distance plate 9-1, between both the bosses 20-1 and 20-2 of the arms 19-1 and 19-2 extending from the distance plates 9-1 9-2, between both the bosses 20-2 and 20-3 of the arms 19-2 and 19-3 extending from the distance plates 9-2 and 9-3 between the boss 20-3 of the arm 19-3 extending from the distance plate 9-3 and the flange portion of the shaft 18 respectively. The arrangement of the four coned disc springs 21 makes it possible to hold the distance plates 9-1, 9-2 and 9-3 in the floated state without any occurance of interferance between the adjacent distance plates, between the distance plate and the annular plate and between the distance plate and the vertically extending member.

Each of the bosses 20-1, 20-2 and 20-3 includes a driving arm as identified with reference numerals 22-1, 22-2 and 22-3 respectively and each of said driving arms 22-1, 22-2 and 22-3 is operatively connected to an actuating cylinder represented by reference numerals 23-1, 23-2 and 23-3 in the following manner respectively, said actuating cylinders 23-1, 23-2 and 23-3 being movably mounted on the upper frame 1 or the side frame 3. Specifically, the driving arms 22-1, 22-2 and 22-3 are operatively connected to the corresponding actuating cylinders 23-1, 23-2 and 23-3 by way of rods 24-1, 24-2 and 24-3 and flexible joints 25 and the actuating cylinders 23-1, 23-2 and 23-3 are also operatively connected to the upper frame 1 or the side frame 3 by way of flexible joints 25 whereby each of the actuating cylinders 23-1, 23-2 and 23-3 is adapted to move in response to turning movement of the driving arms 22-1, 22-2 and 22-3 and axial displacement of the bosses 20-1, 20-2 and 20-3 due to deflection of the coned disc springs 21.

Structures and function of the vulcanizing press in accordance with the second embodiment other than those described above are identical to those in the first embodiment and therefore repeated description will not be required.

The vulcanizing press in accordance with the second embodiment has the following advantageous features in addition to those in the first embodiment. Specifically, any number of distance plates selected from the three distance plates 9-1, 9-2 and 9-3 are put in use by combined operations of the actuating cylinders 23-1, 23-2 and 23-3 so as to accommodate to variation in thickness of a die. For instance, when a die having a comparatively heavy thickness is placed on the lower frame 2, two distance plates 9-2 and 9-3 are caused to assume the position located in vertical alignment with the die while distance plate 9-1 is held at the first position located outward of the vulcanizing press and after it is confirmed that correct alignment is achieved, the working cylinders 16 are operated until a combination of the distance plates 9-2 and 9-3 comes in abutment against the vertically extending member 7 and thereby required depressing force is transmitted to the die. During depressing operation the distance plates 9-2 and 9-3 are displaced downward by an appreciable distance but there is no fear of causing hindrance to the operation owing to the arrangement of the flexible joints 25 for the actuating cylinders 23-2 and 23-3. After depressing force is released, the distance plates 9-2 and 9-3 resume their original position with the aid of resilient force of the coned disc springs 21 and therefore their turning movement toward the first position located outward of the vulcanizing press is carried out without any hindrance. Accordingly, a stroke of the working cylinders 16 can be determined shorter than in the first embodiment and an amount of die opening in the event of failure, injury or the like caused on a die can be reduced so that quick response to variation in thickness of a die is assured.

Figure 5:
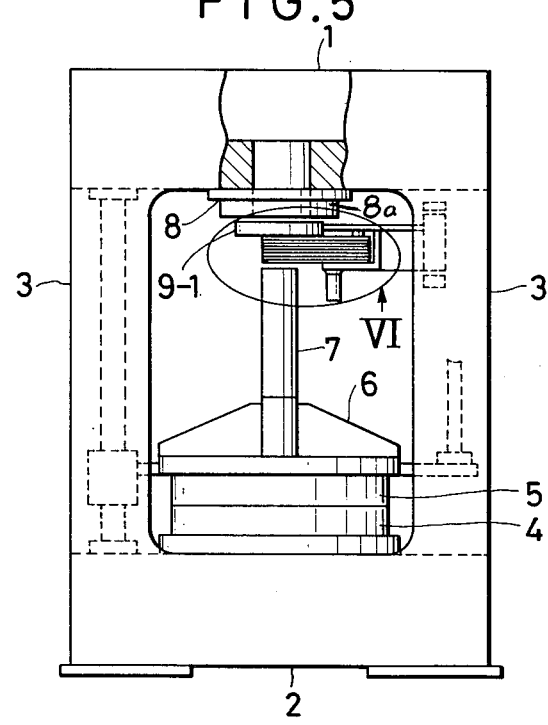
FIG. 5 is a partially sectioned front view of a tire vulcanizing press in accordance with the third embodiment of the invention.
Figure 6:
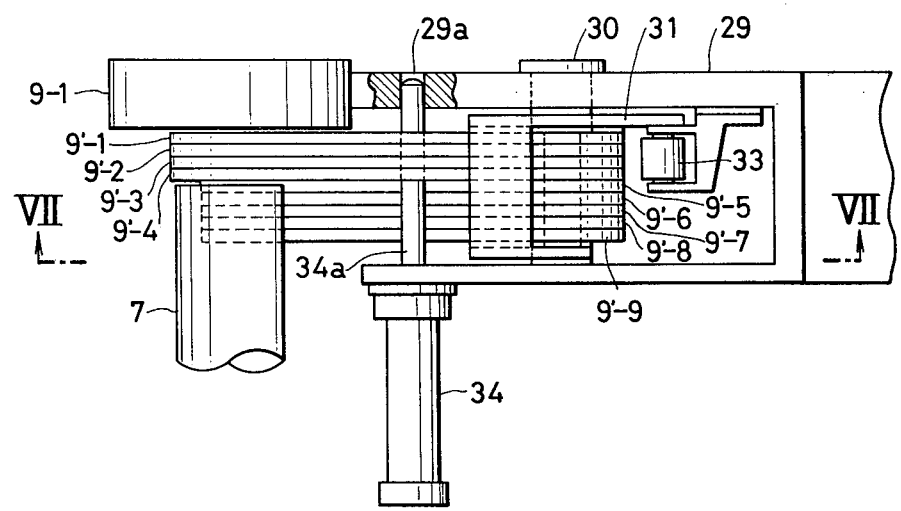
FIG. 6 is a partially sectioned view of the section VI in FIG. 5, shown in an enlarged scale
Figure 7:
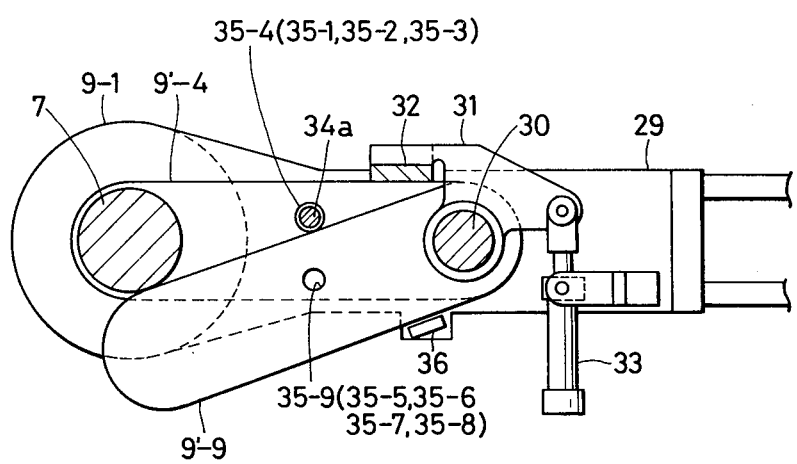
FIG. 7 is a view of the section VI as seen from the bottom in the direction as identified with arrow marks VII in FIG. 6.

Next, description will be made as to the third embodiment as illustrated in FIGS. 5 to 7.

In this embodiment the vulcanizing press includes a combination of a distance plate 9-1 (turnably supported on the upper frame 1 or the side frame 3 in the same manner as in the first and second embodiments) and a group of distance plates 9', said distance plate 9-1 being in use when a die to be mounted has the maximum thickness and said group of distance plate 9' being additionally used when a die has a thickness dimensioned between the maximum and minumum ones. In the illustrated embodiment the group of distance plates 9' is constructed by nine distance plates 9'-1 to 9'-9 each of which is turnably supported on a shaft 30 attached to an arm 29. Further, another arm 31 is turnably fitted onto the shaft 30 and a permanent magnet 32 is fixedly secured to the one end of said arm 31 (see FIG. 7). The permanent magnet 32 has a length as measured in the vertical direction which is dimensioned so as to attract all the distance plates 9'-1 to 9'-9 when they are located in the same positional phase. To the other end of the arm 31 is pivotally connected a rod of an actuating cylinder 33 which is swingably supported on the arm 29. Further, another actuating cylinder 34 is fixedly secured to the arm 29 in parallel to the shaft 30 in such a manner that when a rod 34a of said actuating cylinder 34 is caused to project upward, it enter a hole 29a formed on the upper part of the arm 29 and while all the distance plates 9'-1 to 9'-9 are superimposed one above another at the position located in alignment with the vertically extending member 7, it extends through all holes 35-1 to 35-0 formed on the distance plates 9'-1 to 9'-9.

Further, as will be seen from FIG. 6, while the rod 34a extends through the holes 35-1 to 35-4 on the distance plates 9'-1 to 9'-4 which are selected from the distance plates 9'-1 to 9'-9 and thereby the distance plates 9'-1 to 9'-4 are kept immovable relative to the distance plate 9-1, the residual distance plates 9'-5 to 9'-9 are kept immovable relative to the distance plate 9-1 by means of the rod 34a and the stopper 36 extending between both the upper and lower parts of the arm 29 with the distance plates 9'-5 to 9'-9 held therebetween.

To facilitate understanding of this embodiment description will be typically made as to the case where a die having the maximum thickness is in use, that is, just the distance plate 9-1 is in use as well as to the case where a die having a medium thickness is in use, that is, the distance plates 9'-1 to 9'-4 and the distance plate 9-1 are in use.

It is assumed that the distance plate 9-1 is located outward of the vulcanizing press. The distance plates 9'-1 to 9'-9 are also located outward of the vulcanizing press. The raising and lowering table 6 is disconnected from the upper die half 5 and it is then raised up. Since there exists no obstacle above the vertically extending member 7, the latter is raised up until it extends into the through hole on the upper frame 1. Next, the lower die half 4 is disconnected from the lower frame 2 and both the upper and lower die halves 4 and 5 are removed from the vulcanizing press. Now, a new die is ready to be placed on the lower frame 2.

After completion of correct centering the lower die half 4 is firmly fixed to the lower die half 2 and the raising and lowering table 6 is then lowered so that it is fixed to the upper die half 5.

Next, while the distance plate 9-1 and the group of distance plates 9'-1 to 9'-9 are located outward of the vulcanizing press, the rod 34a is caused to retract and thereby they are ready to turn. The cylinder 33 is actuated to turn the arm 31 until the permanent magnet 32 at the free end of the arm 31 attracts all the distance plates 9'-1 to 9'-9. Thereafter, the cylinder 33 is actuated again to turn the arm 31 further until the group of distance plates 9'-1 to 9'-9 assume the same positional phase as that of the distance plate 9-1. While this positional phase is maintained, the arm 29 is caused to turn into the vulcanizing press. At this moment the vertically extending member 7 is lowered below the height position where a die having the maximum thickness is to be placed and therefore some of the distance plates 9'-1 to 9'-9 which comes in abutment against the vertically extending member 7 as the arm 29 is turned fails to move inward of the latter.

As the arm 29 is turned further, the distance plates 9'-5 to 9'-9 which are inhibited from further movement by means of the vertically extending member 7 are released from attractive force of the permanent magnet 32 whereby they are left behind as they abut against the vertically extending member 7. However, the other distance plates 9'-1 to 9'-4 are turned together with the arm 29 until the positional limit located inside the vulcanizing press is reached. Next, the cylinder 34 is actuated so as to allow the rod 34a to project upward so that the latter extends through the holes 35-1 to 35-4 on the distance plates 9'-1 to 9'-4 to hold them immovable relative to the arm 29 and the residual distance plates 9'-5 to 9'-9 are held immovable relative to the arm 29 by means of the rod 34a and the stopper 36 with the distance plates 9'-5 to 9'-9 disposed therebetween.

Selective adjustment for the distance plates 9'-1 to 9'-9 when replacing a die with another one having a different thickness has been completed by way of the steps as described above. Now, the distance plate 9-1 and the group of distance plates 9'-1 to 9'-4 interposed between the working cylinder 8 and the vertically extending member 7 serve as a working distance plate and depressing force of the working cylinder 8 is transmitted to a new die to be tightly closed by way of the group of distance plates 9-1 and 9'-1 to 9'-4, the vertically extending member 7 and the raising and lowering table 6. Owing to the arrangement of the distance plates in the above-described manner die opening caused due to an occurance of failure or the like accident can be confined within a distance substantially equal to the thickness of a single distance plate and therefore a stroke of the working cylinder 8 can be determined to a working stroke substantially equal to the thickness of two distance plates which refer to the distance plates 9'-1 to 9'-9 but not to the distance plate 9-1. As a result a vulcanizing press adapted to accommodate to variation in thickness of a die more adequately than in the second embodiment can be provided.

Each of the three embodiments has been described with respect to the arrangement that a single vertically extending member 7 is disposed at the central position of the vulcanizing press. Alternatively, a plurality of vertically extending members may be disposed. Further, the second embodiment has been described with respect to the arrangement that the distance plates are brought to the position in vertical alignment with the die by turning movement about a support shaft. Alternatively, a working height of distance plates may be selectively determined by rotary movement of distance plates disposed one above another on their circular tracks of which radius is defined by the center of a die and the axis of a support shaft located outward of the vulcanizing press. Moreover, a working cylinder in both the first and third embodiments may be replaced with a plurality of working cylinders in the second embodiment and vice versa.

What is claimed is:

1. A tire vulcanizing press of the type including an upper frame, a lower frame and side frames by way of which said upper frame and said lower frame are integrally connected to one another, wherein a lower die half is fixedly mounted on the lower frame and an upper die half is fixedly secured to a raising and lowering table adapted to be raised up or lowered by means of a raising and lowering means fixedly attached to the upper frame in such a manner that the upper die half is displaced away from or toward the lower die half, characterized in that the raising and lowering table has a vertically extending member fixedly mounted thereon, a working cylinder is secured to the bottom of the upper frame having a piston reciprocally mounted therein and a distance plate is disposed between the working cylinder piston and the vertically extending member in such a manner as to be displaced away from the operative position to the inoperative position and vice versa, the working cylinder and piston both comprising a doughnut-shaped cylinder having a through hole formed at the central part thereof.

2. A tire vulcanizing press of the type including an upper frame, a lower frame and side frames by way of which said upper frame and said lower frame are integrally connected to one another, wherein a lower die half is fixedly mounted on the lower frame and an upper die half is fixedly secured to a raising and lowering table adapted to be raised up or lowered by means of a raising and lowering means fixedly attached to the upper frame in such a manner that the upper die half is displaced away from or toward the lower die half, characterized in that the raising and lowering table has a vertically extending member fixedly mounted thereon, a working cylinder is secured to the bottom of the upper frame and a distance plate is disposed between the working cylinder and the vertically extending member in such a manner as to be displaced away from the operative position to the inoperative position and vice versa, the working cyclinder comprising a plurality of cylinders of which actuating rod for each is secured to a doughnut-shaped circular plate.

3. A tire vulcanizing press as defined in claims 1 or 2, characterized in that the distance plate comprises a plurality of distance plates.

4. A tire vulcanizing press as defined in claim 3, characterized in that the plural distance plates comprise a distance plate having a relatively heavy thickness and a plurality of distance plates having a relatively thin thickness.

5. A tire vulcanizing press as defined in claims 3, characterized in that each of the plurality of distance plates is displaced away from the operative position to the inoperative position and vice versa individually so as to make an adjustment in dependence on variation in thickness of a die.

* * * * *